United States Patent
Schreter et al.

(10) Patent No.: US 9,971,770 B2
(45) Date of Patent: May 15, 2018

(54) INVERTED INDEXING

(71) Applicants: Ivan Schreter, Mannheim (DE);
Chaitanya Gottipati, Hyderabad (IN);
Thomas Legler, Walldorf (DE)

(72) Inventors: Ivan Schreter, Mannheim (DE);
Chaitanya Gottipati, Hyderabad (IN);
Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 763 days.

(21) Appl. No.: 14/552,897

(22) Filed: Nov. 25, 2014

(65) Prior Publication Data

US 2016/0147808 A1 May 26, 2016

(51) Int. Cl.
*G06F 17/30* (2006.01)
(52) U.S. Cl.
CPC .. *G06F 17/30011* (2013.01); *G06F 17/30622* (2013.01)
(58) Field of Classification Search
None
See application file for complete search history.

(56) References Cited

U.S. PATENT DOCUMENTS

| | | | | |
|---|---|---|---|---|
| 5,884,307 | A * | 3/1999 | Depledge | G06F 17/30312 |
| 2008/0059420 | A1 * | 3/2008 | Hsu | G06F 17/30631 |
| 2008/0306949 | A1 * | 12/2008 | Hoernkvist | G06F 17/30622 |
| 2009/0089256 | A1 * | 4/2009 | Transier | G06F 17/30613 |
| 2009/0182709 | A1 * | 7/2009 | Ritchie | G06F 17/30327 |
| 2011/0040762 | A1 * | 2/2011 | Flatland | G06F 17/30622 707/737 |
| 2014/0129530 | A1 * | 5/2014 | Raufman | G06F 7/78 707/693 |
| 2014/0358961 | A1 * | 12/2014 | Louvau | G06F 17/30424 707/769 |
| 2015/0213463 | A1 * | 7/2015 | Turner | G06Q 30/0201 705/7.33 |

\* cited by examiner

*Primary Examiner* — Aleksandr Kerzhner
*Assistant Examiner* — Eddy Cheung
(74) *Attorney, Agent, or Firm* — Sterne, Kessler, Goldstein & Fox P.L.L.C.

(57) ABSTRACT

Disclosed herein are system, method, and computer program product embodiments for inverted indexing. An embodiment operates by receiving a request to add a new document identifier (doc ID) to an inverted index. A memory block corresponding to where the doc ID is to be added is determined or located, and the available space remaining in the memory block is determined. If the memory block has available space, the doc ID is added to the memory block.

16 Claims, 3 Drawing Sheets

INVERTED INDEXING

BACKGROUND

Indexes are used in a database to track which documents of a database include a particular value. Indexes however can become problematic when they need to be resized, as the resizing process requires that the existing index is locked, a new index is created, the existing index is copied into the new index, and finally the new value added, before the new index is unlocked. This process of resizing an index consumes valuable system resources and can cause processing delays.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for inverted indexing.

Figure 1:
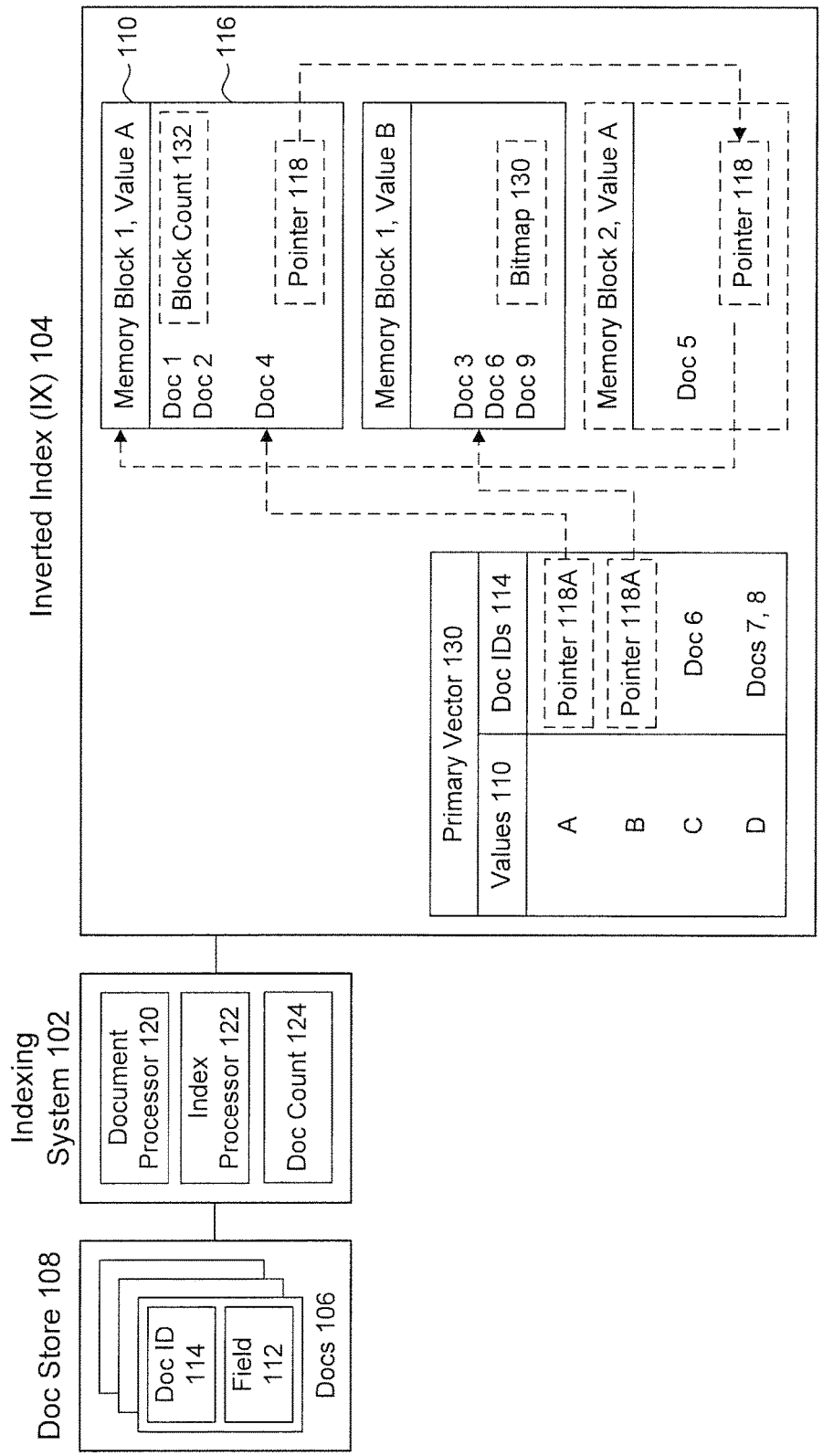
FIG. 1 is a block diagram of an inverted indexing system, according to an example embodiment.

FIG. 1 is a system 100 for inverted indexing, according to an embodiment. Indexing system 102 maintains an inverted index (IX) 104 for documents 106 in a document store 108.

Indexing system 102 indexes, tracks, or otherwise identifies which documents 106 contain a particular value 110. Indexing system 102 stores the corresponding document identifiers (doc IDs) 114 in IX 104. Then, for example, if a query is received from a user or system as to which documents 106 of doc store 108 contain a particular value 110, indexing system 102 may quickly retrieve the corresponding doc IDs 114 from IX 104 rather than querying each document 106 of doc store 108.

Querying each document 106, without use of IX 104, may be an expensive process that requires both extra time and resources. For example, the full text of each document 106 may need to be searched to determine which doc (s) 106, if any, of doc store 108 contain value 110. This problem becomes worse as the number of docs 106 stored increases.

In an embodiment, doc store 108 may be any memory or storage used to store data and/or files, including, but not limited to a database. In an embodiment, doc store 108 may include a large number of documents 106. The docs 106 may include various fields 112 of data that are associated with particular values 110. For example, field 112 may include a broad category or description of data. Example fields 112 may include account balance, interest rate, name, city, state, country, zip code, age, or any other field of data. Value 110 may be any number, string, text, or alpha-numeric and/or symbolic searchable combination of characters. In an embodiment, a particular field 112 may correspond to a particular data-type of value 110 (e.g., integer, string, real, Boolean, etc.). Value 110 may correspond to one or more fields 112.

IX 104 may be used to track which documents 106 include particular values 110 corresponding to one or more fields 112 of the documents 106. For example, IX 104 may be associated with a zip code field 112. Then for example, IX 104 may track which documents 106 include zip codes of specified values 110 (e.g., 20005, 22015, 22079 . . . ).

As another example, IX 104 may correspond to an account balance field 114. And value 110s may correspond to ranges of account balances. For example, value A may include account balances of greater than one million dollars, value B may include account balances that are negative (less than 0), and value C (not shown) may include account balances between 0 and 1 million dollars.

In an example embodiment, different fields 112 may correspond to different IXs 104. For example, a first IX 104 may be used for a name field 112, while a second IX 104 may be used for a country field 112.

Inverted indexes generally store any document identifiers that correspond to a particular value in an array. When a new document is added to a document storage area that includes the value corresponding to the array, a new document identifier needs to be added to the array (corresponding to the inverted index). To add the new document identifier to a general inverted index, the inverted index must first be locked (e.g., all reads/writes on the inverted indexed are paused/stopped), a new array is created of a greater size (i.e. one additional size than the previous array), the values of the old or original array are copied to the new array, and the new document identifier is added to the new array. The old array is discarded, and then the new array is unlocked.

This process of locking the array, causing pending operations to pause, stop or otherwise be blocked, generating a new array, and copying the old values to the new array, can be very costly in terms of time and computing resources, especially as the array and/or number of stored documents that include the value grow in size. For example, in a large document storage area may include a billion or more documents, which could yield arrays in excess of one million entries. To generate a new array and copy a million entries is very costly in terms of computing resources and time.

Unlike general inverted indexes that use arrays to store document identifiers, IX 104 uses memory blocks 116 to store doc IDs 114. A memory block 116 is a contiguous portion or chunk of memory that is allocated to store one or more doe IDs 114 associated with a particular value 110. For example, each value 110 may correspond to a particular memory block 116. Then, when a document 106 is identified with a particular value 110, the memory block 116 corresponding to that value 110 is identified. The identified memory block 116 is then checked to see if it has enough free memory to store the doc ID 114 corresponding to the document 106. If the memory block 116 has enough memory, the new doc ID 114 is added to the memory block 116.

In an embodiment, a primary vector 132 may track which values 110 are found amongst documents 106. Primary vector 132 may be a storage area, such as a vector or array, that is used to store a limited amount of data. For example, primary vector 132 may store values 110 and a number of corresponding doc IDs 114. When the number of doc IDs 114 corresponding to a particular value 110 exceeds a threshold (for example, two), primary vector 132 may include a pointer 118A to a corresponding memory block 110 that includes the doc IDs 114.

If the memory block 116 however does not have enough available memory to accommodate the storage of another doc ID 114, a new memory block 116 is allocated to the value 110. The new memory block 116 may be of the same size, or any different size than the original memory block 116. The new doc ID 114 is then added to the newly allocated memory block 116. Then for example, a pointer 118 may be added to the new memory block 116 (e.g., block 2, val A) that points to the previous memory block 116 (e.g., block 1, val A) corresponding to the value 110. Similarly, a pointer 118 from the previous memory block 116 may be added that points to the newly allocated memory block 116.

In an embodiment, each memory block 116 may include a block count 132 that tracks how many doc IDs 114 are stored in a particular memory block 116, for a particular value 110. For example, in FIG. 1, the respective block counts 132 for memory blocks 1A, 1B, and 2A may be 3, 3, 1.

Also unlike general inverted indexes, IX 104 does not need to be locked to add new doc IDs 104. Nor do the old/existing document identifiers need to be copied from one location to another (e.g., from one array into a new array). Instead, IX 104 uses fewer computing resources and saves time by allocating new memory blocks and adding one or more pointers 118 (if necessary) when new doc IDs 114 need to be added to IX 104.

Indexing system 102 may include a document processor 120 that processes new documents 106 added to doc store 108. For example, after one or more documents 106 are uploaded or otherwise added to document store 108, document processor 120 scans or otherwise searches the added documents 106 for values 110 corresponding to one or more IXs 104. Or for example, if a document 106 is modified, document processor 120 may scan or search the modified doc 106. If a document 106 is identified that includes a value 110, the doc ID 114 and corresponding value(s) 110 (and field(s) 112, if necessary) may be provided to index processor 122.

Index processor 122 may then identify the memory block 116 corresponding to the value(s) 110 and field(s) 112. Upon identifying the memory block 116, index processor 122, may as discussed above, either add the doc ID 114 to the memory block or request/allocate a new memory block 116 to add the doc ID 114.

In an embodiment, the doc IDs 114 may be sequential numbers generated by indexing system 102. Doc count 124 may include the most recently created doc ID 114. In another embodiment, if docs IDs 114 are not sequential numbers, then doc count 124 may include a count of how many documents 106 are included in doc store 108.

In an embodiment, in addition to or in lieu of storing doc IDs 114, a memory block 110 may include a bitmap 130. Bitmap 130 may be used to save space in memory 110. For example, in an embodiment, doc ID 114 may be 32 bits, and bitmap 130 may be 1 bit. Using a bitmap 130 may save resources, for example, by reducing memory accesses. Based on the bitmap 130, indexing system 102 may determine which doc IDs 114 correspond to value 110.

When a bitmap 130 is being created/allocated and populated (e.g., for example, if an existing bitmap 130 is full), the new bitmap 130 is not accessible to any readers that may be accessing IX 104 until the bitmap 130 is fully populated with whatever doc ID(s) 114 correspond to the associated value 110. Once the bitmap 130 is populated, any subsequent read requests may be diverted to the new bitmap 130, or the bitmap 130 is otherwise made live and accessible to readers.

System 100 includes an indexing system 102 that tracks which documents 106 of a database or other document storage 108 include particular value(s) 110. Using memory blocks 116, instead of a standard array, system 100 allows for the addition of new doc IDs 114 to the IX 104 without the need to lock/unlock the inverted index.

Figure 2:
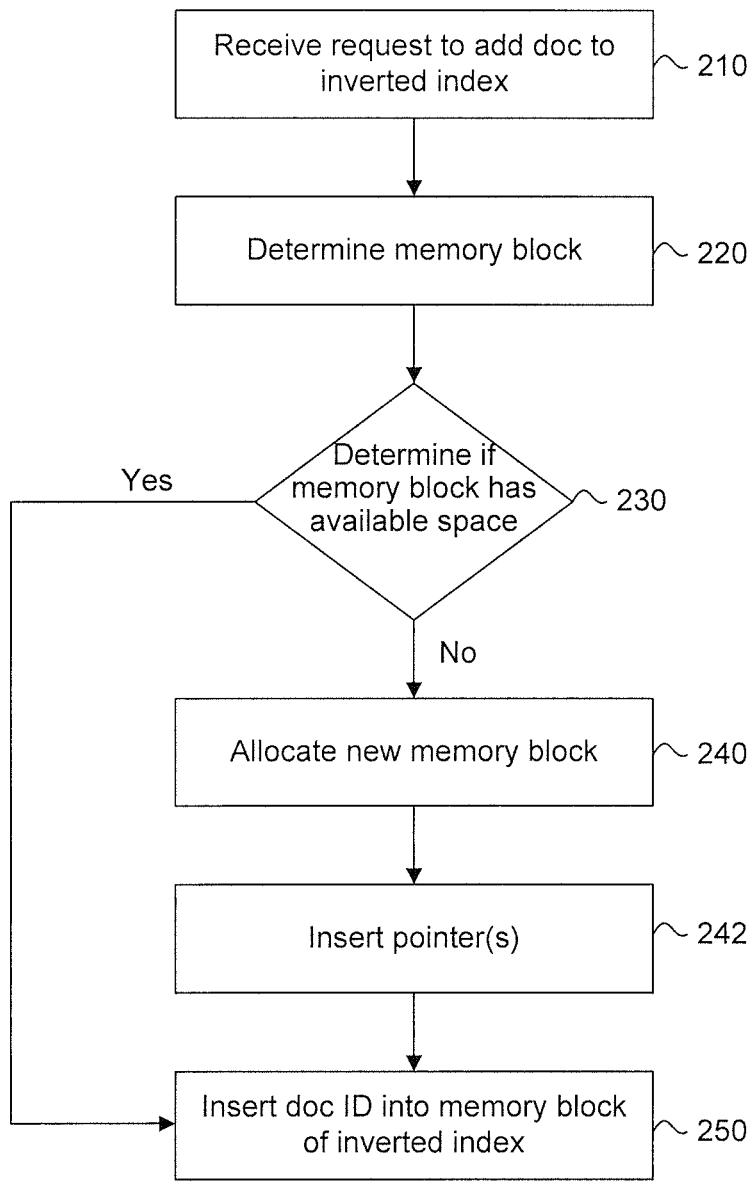
FIG. 2 is a flowchart illustrating a process for inverted indexing, according to an example embodiment.

FIG. 2 is a flowchart for a method 200 for inverted indexing, according to an embodiment. Method 200 can be performed by processing logic that can comprise hardware (e.g., circuitry, dedicated logic, programmable logic, microcode, etc.), software (e.g., instructions run on a processing device), or a combination thereof.

In step 210, indexing system 102 receives a request to add a new document identifier (doc ID) to an inverted index. For example, a user or other system may upload or request to add a document 106 to doc store 108. Document processor 120 may process the document 106 to determine if the document 106 includes any of values 110 associated with any of one or more IXs 104. If document 106 includes a value 110 (e.g., in a particular field 112 or document text), then document processor 120 may send the doc ID 114 and value 110 (and field 112 or associated IX 104, if necessary) to index processor 104. Index processor 122 may receive this request to add the new doc ID 114 to IX 104.

In step 220, indexing system 102 determines which memory block, if any, includes a most recently added doc ID. For example, index processor 122 may request from or otherwise identify within IX 104 which memory block 116 includes the most recently added doc ID 114 corresponding to the value 110.

In step 230, indexing system 102 determines whether the memory block has available space for the doc ID. For example, index processor 122 may determine if memory block 116 has available memory to store a new or additional doc ID 114. Index processor 122 may check the available space and/or used space of the memory block 116 to make this determination. In an embodiment, it may be known that a document ID 114 uses 32 bits of memory. Then for example, index processor 122 may determine if a memory block has more or less than 32 bits of memory.

If the memory block does not have available space for the doc ID, indexing system 102 allocates a new memory block into which to insert the new doc ID (Step 240), generates a pointer from the memory block that includes the most recently added doc ID to the to the new memory block (242). For example, index processor 122 (or another processor) may request to allocate a new memory block 116. One or more pointers 118 may be generated that link the previous memory block 116 to the new memory block 116, and/or vice versa.

In an embodiment, if a bitmap 130 is being used to store doc IDs 114, instead of checking memory bock 116 for available space, bitmap 130 may be checked for available space. If the bitmap 130 is full, a new bitmap 130 may be allocated. For example, the new bitmap 130 may be larger than the existing/full bitmap 130, and may be populated with the existing values from the full bitmap 130.

Or for example, IX 104 may include a list of doc IDs 114 that correspond to a value 110 of a particular field 112. If a particular document includes a value 110 that does not correspond to an existing memory block 116, a new memory block 116 may be allocated for the new value 110 (e.g., if there is not enough space in primary vector 132).

In step 250, indexing system 102 inserts the new doc ID into the memory block. For example, if there is available memory space available or if a new memory block 116 has been allocated, index processor 122 may add or request that doc ID 114 is added to the memory block 116 or bitmap 130.

Figure 3:
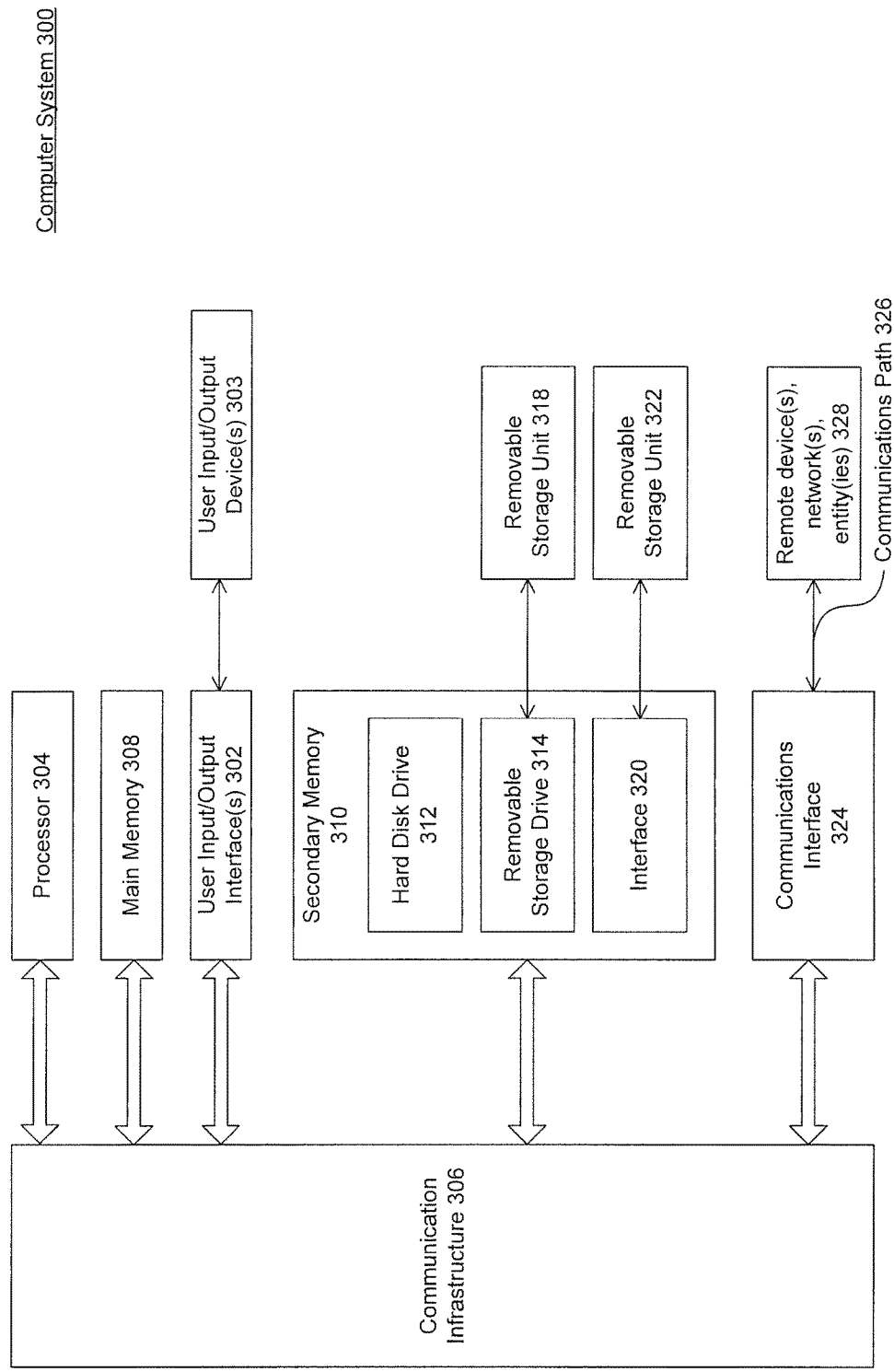
FIG. 3 is an example computer system useful for implementing various embodiments.

Various embodiments can be implemented, for example, using one or more well-known computer systems, such as computer system 300 shown in FIG. 3. Computer system 300 can be any well-known computer capable of performing the functions described herein.

Computer system 300 includes one or more processors (also called central processing units, or CPUs), such as a processor 304. Processor 304 is connected to a communication infrastructure or bus 306.

One or more processors 304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 also includes user input/output device(s) 303, such as monitors, keyboards, pointing devices, etc., that communicate with communication infrastructure 306 through user input/output interface(s) 302.

Computer system 300 also includes a main or primary memory 308, such as random access memory (RAM). Main memory 308 may include one or more levels of cache. Main memory 308 has stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 includes a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 reads from and/or writes to removable storage unit 318 in a well-known manner.

According to an exemplary embodiment, secondary memory 310 may include other means, instrumentalities or other approaches for allowing computer programs and/or other instructions and/or data to be accessed by computer system 300. Such means, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 enables computer system 300 to communicate and interact with any combination of remote devices, remote networks, remote entities, etc. (individually and collectively referenced by reference number 328). For example, communication interface 324 may allow computer system 300 to communicate with remote devices 328 over communications path 326, which may be wired and/or wireless, and which may include any combination of LANs, WANs, the Internet, etc. Control logic and/or data may be transmitted to and from computer system 300 via communication path 326.

In an embodiment, a tangible apparatus or article of manufacture comprising a tangible computer useable or readable medium having control logic (software) stored thereon is also referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 3. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
    receiving a request to add a new document identifier to an inverted index, wherein document identifiers in the inverted index correspond to documents that include a value;
    determining a first memory block that includes a most recently added document identifier corresponding to the value;
    determining that the first memory block does not have available space for the new document identifier;
    allocating a new memory block of the inverted index corresponding to the value;
    inserting the new document identifier into the new memory block of the inverted index, wherein the inverted index includes both the document identifiers of the first memory block and the new document identifier of the new memory block; and
    generating a first pointer that points from the first memory block to the new document identifier in the new memory block and a second pointer that points from the new memory block to the first memory block, wherein both the first and new memory blocks of the inverted index comprise a continuous portion of memory that is allocated to store document identifiers corresponding to the value.

2. The method of claim 1, wherein the document includes a plurality of fields, wherein inverted index is associated with a selected one of the fields, and wherein the field is associated with a plurality of values, each value corresponding to one or more memory blocks.

3. The method of claim 2, further comprising:
    determining that the field of the document corresponding to the new document identifier includes a value not included in the plurality of values;
    creating the new memory block into which to insert the new document identifier, wherein the new memory block corresponds to the value not included in the plurality of values;
    inserting the new document identifier into the new memory block.

4. The method of claim 1, wherein inverted index includes a bitmap value corresponding to which documents of the document store include the value.

5. The method of claim 4, wherein the inserting comprises adjusting the bitmap value to correspond to the new document identifier.

6. The method of claim 1, wherein the first memory block includes a bitmap corresponding to one or more document identifiers correspond to value, and one or more document identifiers outside of the bitmap.

7. The method of claim 1, wherein the first memory block includes a block count of how many document identifiers are stored in the particular memory block and corresponding to the value.

8. A system, comprising:
    a memory; and
    at least one processor coupled to the memory and configured to:
        receive a request to add a new document identifier to an inverted index, wherein document identifiers in the inverted index correspond to documents that include a value;
        determine a first memory block that includes a most recently added document identifier corresponding to the value;
        determine that the first memory block does not have available space for the new document identifier;
        allocate a new memory block of the inverted index corresponding to the value;
        insert the new document identifier into the new memory block of the inverted index, wherein the inverted index includes both the document identifiers of the first memory block and the new document identifier of the new memory block; and
        generate a first pointer that points from the first memory block to the new document identifier in the new memory block and a second pointer that points from the new memory block to the first memory block, wherein both the first and new memory blocks of the inverted index comprise a continuous portion of memory that is allocated to store document identifiers corresponding to the value.

9. The system of claim 8, wherein the document includes a plurality of fields, wherein inverted index is associated with a selected one of the fields, and wherein the field is associated with a plurality of values, each value corresponding to one or more memory blocks.

10. The system of claim 9, wherein the processor is further configured to:
    determine that the field of the document corresponding to the new document identifier includes a value not included in the plurality of values;
    create the new memory block into which to insert the new document identifier, wherein the new memory block corresponds to the value not included in the plurality of values;
    insert the new document identifier into the new memory block.

11. The system of claim 8, wherein inverted index includes a bitmap value corresponding to which documents of the document store include the value.

12. The system of claim 11, wherein the processor configured to insert comprises a processor configured to adjust the bitmap value to correspond to the new document identifier.

13. A non-transitory computer-readable device having instructions stored thereon that, when executed by at least one computing device, causes the at least one computing device to perform operations comprising:
    receiving a request to add a new document identifier to an inverted index, wherein document identifiers in the inverted index correspond to documents that include a value;
    determining a first memory block that includes a most recently added document identifier corresponding to the value;
    determining that the first memory block does not have available space for the new document identifier;
    allocating a new memory block of the inverted index corresponding to the value;
    inserting the new document identifier into the new memory block of the inverted index, wherein the inverted index includes both the document identifiers of the first memory block and the new document identifier of the new memory block; and
    generating a first pointer that points from the first memory block to the new document identifier in the new memory block and a second pointer that points from the new memory block to the first memory block, wherein both the first and new memory blocks of the inverted index comprise a continuous portion of memory that is allocated to store document identifiers corresponding to the value.

14. The computer-readable device of claim 13, wherein the document includes a plurality of fields, wherein inverted index is associated with a selected one of the fields, and wherein the field is associated with a plurality of values, each value corresponding to one or more memory blocks.

15. The computer-readable device of claim 14, the operations further comprising:
    determining that the field of the document corresponding to the new document identifier includes a value not included in the plurality of values;
    creating the new memory block into which to insert the new document identifier, wherein the new memory block corresponds to the value not included in the plurality of values;
    inserting the new document identifier into the new memory block.

16. The computer-readable device of claim 13, wherein inverted index includes a bitmap value corresponding to which documents of the document store include the value.

* * * * *